United States Patent [19]

Asazawa

[11] Patent Number: 5,787,339
[45] Date of Patent: Jul. 28, 1998

[54] RADIOCOMMUNICATION SYSTEM OPERATING IN A TIME SHARED CONTROL

[75] Inventor: Hiroshi Asazawa, Tokyo, Japan

[73] Assignee: NEC Corporation, Tokyo, Japan

[21] Appl. No.: 561,897

[22] Filed: Nov. 22, 1995

[30] Foreign Application Priority Data

Nov. 22, 1994 [JP] Japan .................. 6-287730

[51] Int. Cl.$^6$ .................................................. H04B 1/44
[52] U.S. Cl. ............................................ 455/83; 327/63
[58] Field of Search ............................. 455/73, 78, 80, 455/82, 83, 84; 333/103; 330/51, 254, 261; 327/63, 66, 62, 82, 560, 561, 563

[56] References Cited

U.S. PATENT DOCUMENTS

| | | | |
|---|---|---|---|
| 4,572,979 | 2/1986 | Haar et al. | 310/68 R |
| 4,673,830 | 6/1987 | Giorgetta et al. | 307/297 |
| 5,045,804 | 9/1991 | Sugawara et al. | 330/51 |
| 5,444,864 | 8/1995 | Smith | 455/84 |
| 5,590,411 | 12/1996 | Sroka et al. | 455/78 |

FOREIGN PATENT DOCUMENTS 59-080135  5/1984  Japan .
4-373317  12/1992  Japan .

OTHER PUBLICATIONS

P. O'Sullivan et al., "High Performance Integrated PA, T/R Switch for 1.9 GHz Personal Communications Handsets", IEEE GaAs IC Symposium 93, pp. 33-35 (1993).

Primary Examiner—Reinhard J. Eisenzopf
Assistant Examiner—Darnell R. Armstrong
Attorney, Agent, or Firm—Foley & Lardner

[57] ABSTRACT

A radiocommunication system comprises an input/output stage section of the system, which includes a first and a second differential circuits each having a differential transistor pair and a current source for supplying operational current to each of the differential transistor pairs. The input pair of the first differential circuit is connected to the output pair of a transmitting section of the system to supply an output transmission signal through an antenna. The input of the second differential circuit is connected to the antenna and the output pair thereof are connected to the input pair of a receiving section of the system. Each of the current sources is implemented by a current mirror including a first transistor activated and inactivated by a changeover signal in a time shared control and a second transistor for supplying the operational current to a corresponding one of the differential transistor pairs. The changeover operation effected by the current sources provides advantages of a low insertion loss and a large signal-to-noise ratio.

9 Claims, 7 Drawing Sheets

RADIOCOMMUNICATION SYSTEM OPERATING IN A TIME SHARED CONTROL

BACKGROUND OF THE INVENTION (a) Field of the Invention

The present invention relates to a radiocommunication system and, more particularly, to a radiocommunication system such as a portable telephone system which is operated through changeover between transmission and reception in a time shared control.

(b) Description of Related Art

An example of radiocommunication system (a first conventional radiocommunication system) is described in Japanese Patent Publication No. JP-A-64(1989)-60135. for example. The first conventional radiocommunication system has a switching section inserted in a signal line to directly and selectively establish a signal path for transmission and a signal path for reception alternately, thereby performing transmission and reception in a time shared control.

Figure 1:
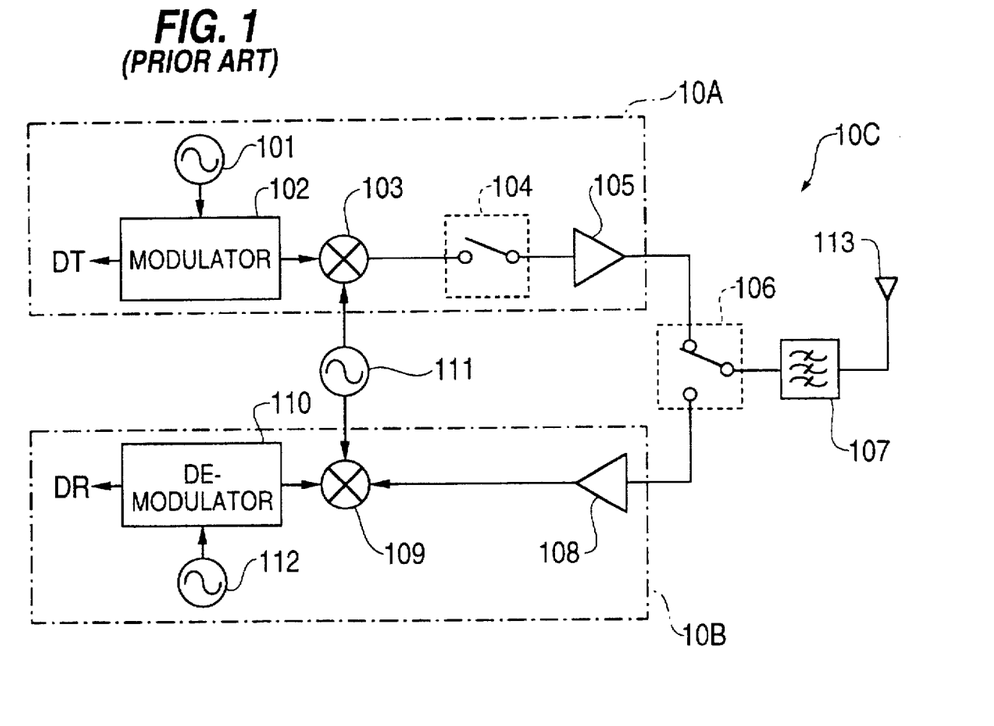
FIG. 1 is a block diagram showing a first conventional radiocommunication system.

Referring to FIG. 1, the first conventional radiocommunication system has a transmitting section 10A, a receiving section 10B and a common section 10C. The transmitting section 10A includes oscillator 101, modulator 102, mixer 103, on-off switch 104, and power amplifier 105. The receiving section 10B includes amplifier 108, mixer 109, demodulator 110, and oscillator 112. The common section 10C includes local oscillator 111, changeover switch 106, band-pass filter 107 and antenna 113.

Oscillator 101 generates a carrier wave for transmission, which is modulated in modulator 102 in accordance with data DT for transmission to generate a modulated signal. Mixer 103 converts the frequency of the modulated signal to a higher frequency by using a local oscillation signal generated by local oscillator 111 to obtain a drive signal for transmission. On-off switch 104 responds to a changeover signal for changeover between transmission and reception to make a transmission path.

Power amplifier 105 amplifies the drive signal to generate a transmission signal having a desired power level. Changeover switch 106 selectively establishes a signal path for transmission and a signal path for reception in accordance with the changeover signal. Band-pass filter 107 removes undesirable frequency components from both signals for transmission and reception. Amplifier 108 amplifies a received signal, which is converted by mixer 109 to a lower frequency by using the local oscillation signal generated by local oscillator 111 to obtain an intermediate frequency signal. Demodulator 110 demodulates the intermediate frequency signal by using a carrier wave for reception generated by oscillator 112 to obtain received data DR.

In operation for a transmission mode, the carrier wave for transmission supplied from oscillator 101 is modulated in modulator 102 by using input transmission data DT supplied from a precedent stage of the transmitting section 10A to generate a modulated signal, which is then supplied to mixer 103 in the transmitting section 10A. The modulated signal is subjected to a frequency conversion in mixer 103 to a higher frequency using the local oscillation signal generated by local oscillator 111. As a result, a drive signal for transmission is obtained.

The drive signal is supplied to power amplifier 105 via on-off switch 104. The drive signal for transmission is amplified by power amplifier 105 to a predetermined power level, thereby obtaining a transmission signal which is supplied through changeover switch 106. Changeover switch 106 connects the filter 107 to power amplifier 105 during the transmission mode, supplying the signal for transmission through the antenna 113 via the filter 107.

In operation for a receiving mode, changeover switch 106 connects filter 107 to amplifier 105 in the receiving section 10B so that a signal received by antenna 113 is supplied to amplifier 108 via band-pass filter 107. After being amplified by amplifier 108, the amplified, received signal is supplied to mixer 108 in the receiving section 10B. The amplified, received signal is subjected to a frequency conversion to a lower frequency in mixer 109 by using the local oscillation signal generated by oscillator 111. As a result, an intermediate frequency signal is generated, which is then supplied to demodulator 110. In demodulator 110, the intermediate frequency signal in demodulated using a carrier wave for reception supplied from oscillator 112. As a result, received data DR are output from demodulator 110 to a next stage of the receiving section 10B of the radiocommunication system.

The first conventional radiocommunication system has a problem that the transmission signals leak, during a receiving mode of the system, through on-off switch 104 or changeover switch 106 to the receiving section 10B. To mitigate this problem, another radiocommunication system (a second conventional radiocommunication system) has been proposed in which a single oscillator is used in place of the plurality of oscillators 101 111 and 112 in FIG. 1 for generating carrier waves and local oscillation signals.

In the second conventional radiocommunication system, a modulated signal is generated by modulating the carrier wave for transmission in accordance with transmission data DT during a transmission mode, while a received signal is directly demodulated, during a receiving mode, without frequency conversion using a reception carrier wave. With this structure, the signals in the transmitting section 10A are prevented from leaking into the receiving section 10B.

In the first and second convention radiocommunication systems as described above, analog switches are used for the switches 104 and 106 for changeover between the transmitting mode and the receiving mode in a time shared mode. An example of such analog switches is described in the paper "High Performance Integrated PA, T/R Switch for 1.9 GHz Personal Communications Handsets" for IEEE GaAs IC Symposium 93, pp. 33–35, published in the U.S.A in 1993.

Figure 2:
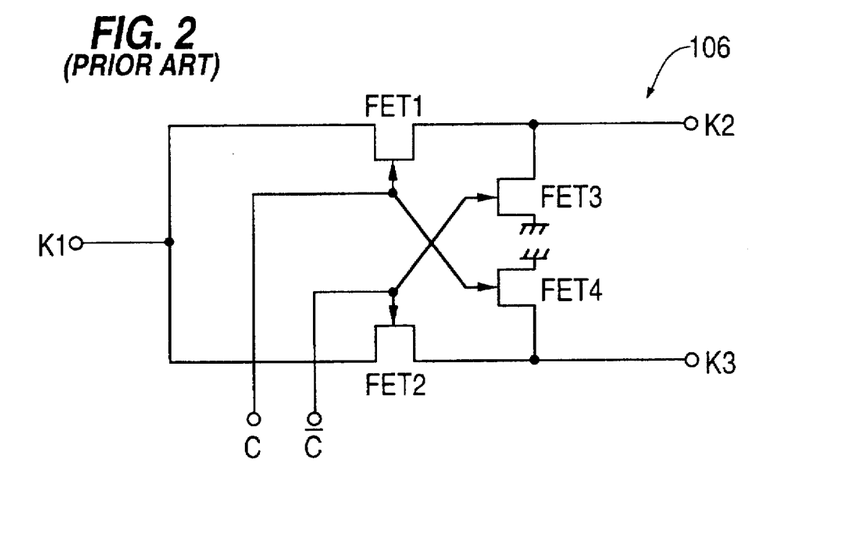
FIG. 2 is a circuit diagram showing the analog changeover switch in FIG. 1 and in a conventional radiocommunication system.

Referring to FIG. 2, the analog switch disclosed in the IEEE paper comprises four field-effect transistors FET1 through FET4. When complementary control signals CONT and $\overline{\text{CONT}}$ are high and low, respectively, terminal K1 communicates with terminal K2. When complementary control signals CONT and $\overline{\text{CONT}}$ are low and high, respectively, terminal K1 communicates with terminal K3. Each of FET1 and FET2 serves as an on-off switch for making and breaking a corresponding signal path. Each of FET3 and FET4 serves as an on-off switch for grounding the respective signal path to decrease the impedance thereof when the corresponding signal path is not made, thereby preventing noise from emerging on the signal path. In general, high-speed GaAs FETs are used for FET1–FET4. Since the threshold voltage VT for GaAs FETs is negative, a negative voltage lower than the negative threshold VT must be applied as the control signal CONT or $\overline{\text{CONT}}$ to the FET1–FET4 so as to selectively turn them off. Further, the FETs generate insertion loss in th system.

Figure 3:
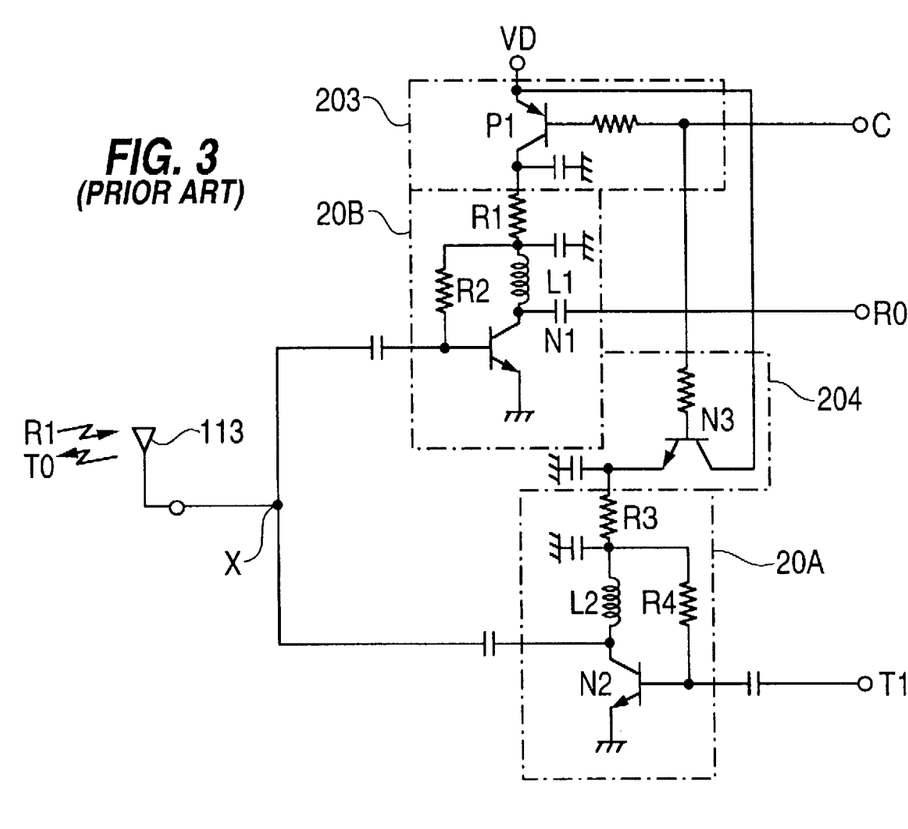
FIG. 3 is a circuit diagram showing a third conventional radiocommunication system.

Japanese Patent Publication No. JP-A-4(1992)-373317 describes another radiocommunication system (a third conventional radiocommunication system), as shown In FIG. 3, in which the operating node is selected by switching the power supply. In FIG. 3, the third conventional radiocommunication system comprises a receiving section 20B including NPN transistor N1, a transmitting section 20A including NPN transistor N2, switching sections 203 and 204. The switching section 203 includes PNP transistor P1 having an emitter and a collector which are connected to a power supply line VD and the receiving section 20B, respectively. The switching section 204 includes NPN transistor N3 having a collector and an emitter which are connected to the power supply line VD and the transmitting section 20A, respectively.

In operation, when the level of a control signal C is lowered to enter a receiving mode, transistor P1 in the switching section 203 is turned on so that power is supplied from the power supply line VD to the collector of transistor N1 through transistor P1, resistor R1, and inductance element (or coil) L1, thereby activating the receiving section 20B. In this mode, an optimal self-bias current is supplied from resistors R1 and R2 to transistor N1. Coil L1 serves as a load for transistor N1. When a signal RI is received through an antenna 113, the signal RI is amplified by transistor N1 and supplied as an output signal RO from the receiving section 20B. In this mode, transistor N3 in the switching section 204 is off to inactivate the transmitting section 20A.

When the level of the control signal C is raised to enter a transmitting mode, transistor N3 in the switching section 204 is turned on so that power is supplied from the power supply line VD to the collector of transistor N2 through transistor N3, resistor R3, and coil L2, thereby activating the transmitting section 20A. In this mode, an optimal self-bias current is supplied from resistors R3 and R4 to transistor N2. Coil L2 serves as a load for transistor N2. Transistor N2 in the transmitting section 20A amplifies an input signal TI to output a transmission signal TO through the antenna 113. In this mode, transistor P1 is off to inactivate the receiving section 20B.

The receiving section 20B and the transmitting section 20A are connected to the antenna 113 through a common node X, and the length of a signal path between the common node X and the receiving section 20B and the length of a signal path between the common node X and the transmitting section 20A are optimally selected to provide the following impedance matching: during a receiving mode, the impedance of the signal path as viewed from the common node X is matched with the input impedance of the receiving section 20B while the impedance for the transmission circuit 20A as viewed from the common node X is made high by the off state of transistor N2: and, during a transmission mode, the impedance of the signal path is matched with the output impedance of the transmitting section 20A while the impedance for the receiving section 20B is made high by the off state of transistor N1.

In the third conventional radiocommunication system, the PNP transistor P1 is used in the switching section 203 for supplying the power. Therefore, during fabricating a single chip of the radiocommunication system, a fabrication process for forming the PNP transistor which is different from the fabrication process for forming NPN transistors is separately effected. Further, the system includes a plurality of coils L1 and L2 and capacitors, which makes the system expensive.

SUMMARY OF THE INVENTION

In view of the foregoing, it is an object of the present invention to provide an improved radiocommunication system which can reduce insertion loss for changeover or reduce signal leakage between the transmitting section and the receiving section, thereby increasing SNR (signal-to-noise ratio) and in which it is not necessary to form PNP transistors and NPN transistors in a single chip.

It is another object of the present invention to provide a radiocommunication system in which a negative supply voltage source for controlling FETs can be omitted.

A radiocommunication system according to the present invention comprises: an antenna, an input/output stage section including a first differential transistor pair having an input pair and an output pair for supplying a differential output through the antenna, a first current source operatively connected to said first differential transistor pair, a second differential transistor pair having an input pair for receiving an input signal through the antenna and an output, a second current source operatively connected to the second differential transistor pair, each of the first and second current sources being activated and inactivated in a time shared control by a changeover signal for supplying operational current to a corresponding one of the first and second differential transistor pairs; a transmitting section having an output pair connected to the input pair of the first differential transistor pair; and a receiving section having an input pair connected to the output pair of the second differential transistor pair.

In accordance with the present invention, the first and second differential transistor pairs are activated and inactivated in a time shared control by a changeover signal supplied to the current sources so that transmission and reception are exchanged without switching means interposed in a signal line. Accordingly, insertion loss of the switch is not included in the output of the input/output stage section to improve a signal-to-noise ratio. Moreover, power supply source for a negative voltage is not necessary in the system so that the circuit structure is simplified or in which a PNP transistor and an NPN transistor are not necessarily included in a single chip of the radiocommunication system.

BRIEF DESCRIPTION OF THE DRAWINGS

The above and other objects, features and advantages of the present invention will be more apparent from the following description, referring to the accompanying drawings in which:

FIG. 4A is a circuit diagram of a radiocommunication system according to a first embodiment of the present invention, while

FIG. 5A is circuit diagram of a radiocommunication system according to a second embodiment of the present invention, while

DESCRIPTION OF THE PREFERRED EMBODIMENTS

Embodiments of the present invention will now be described with reference to the accompanying drawings.

First Embodiment

Figure 4A:
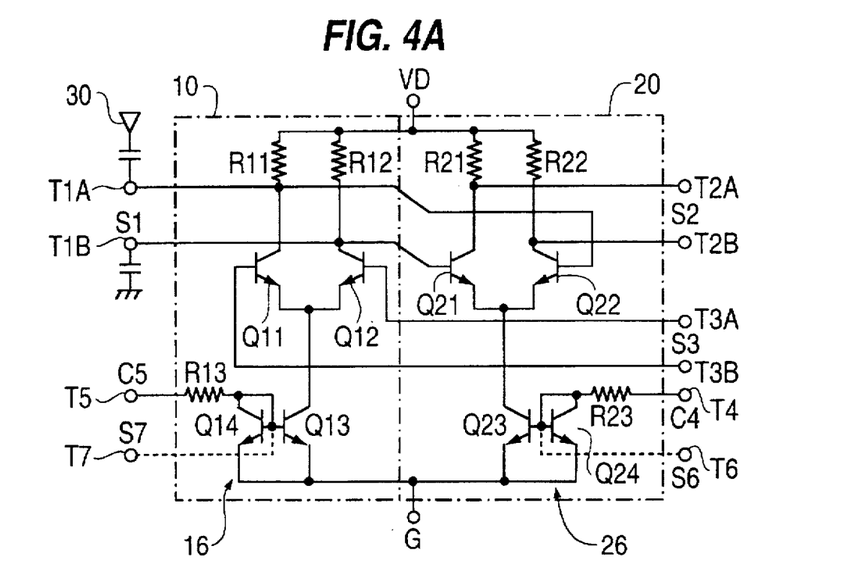

Referring to FIG. 4A, a radiocommunication system according to a first embodiment or the present invention includes, in an input/output stage section of the system, a first differential circuit 10 having a pair of inputs connected to terminal pair T3A and T3B and a pair of outputs connected to terminal pair T1A and T1B, and a second differential circuit 20 having a pair of inputs connected to terminal pair T1A and T1B and a pair of outputs connected to terminal pair T2A and T2B. The second differential circuit 20 functions as an input stage circuit for a receiving section of the system while the first differential circuit 10 functions as an output stage circuit for a transmitting section of the system. Terminals T1A and T1B are connected to antenna 30 and ground, respectively, through capacitors.

The first differential circuit 10 includes a differential transistor pair Q11 and Q12, load resistors R11 and R12, bias resistor R13, and a pair of transistors Q13 and Q14. The emitters of transistors Q11 and Q12 are connected with each other to form a first emitter pair, and the collectors of transistors Q11 and Q12 are connected to a power supply line VD via load resistors R11 and R12, respectively. Transistors Q13 and Q14 have bases connected in common to control terminal T5 through bias resistor R13 to form a first current mirror circuit 16 for supplying operational current to the first emitter pair.

The second differential circuit 20 includes a differential transistor pair Q12 and Q22, load resistors R21 and R22, bias resistors R23, and a pair of transistors Q23 and Q24. The collector outputs of transistors Q11 and Q12 in the first differential circuit 10 are connected to the bases of transistors Q21 and Q22 in the second differential circuit 20. The emitters of transistors Q21 and Q22 are connected with each other to form a second emitter pair, and the collectors of transistors Q21 and Q22 are connected to the power supply line VD via load resistors R21 and R22, respectively. Transistors Q23 and Q24 have bases connected in common to control terminal T4 through bias resistor R23 to form a second current mirror circuit 26 for supplying operational current to the second emitter pair.

In both of the first and second current mirror circuits 16 and 26, transistors Q13 and Q23 for supplying operational current has an emitter size ten times larger than those of transistors Q14 and Q24, respectively.

The pairs of terminals T1A and T1B, T2A and T2B, and T3B and T3B constitute differential input or output terminal pairs for inputting or outputting differential signals S1–S3. The characters "A" and "B" in reference symbols T1A and T1B, for example, represent non-inverting and inverting terminals in each differential terminal pair, which will be collectively denoted simply by T1 in FIGS. 4A and 4B. Control terminals T4 and T5 are supplied with control signals C4 and C5 which activate or inactivate the differential circuits 20 and 10, respectively, by supplying constant current thereto. Control signals C4 and C5 constitute a complementary signal pair in which, when one of the control signals C4 and C5 is high, the other is low.

Figure 4B:
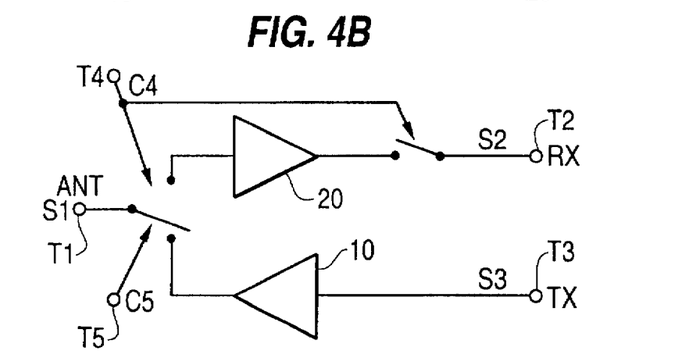
FIGS. 4B and 4C are block diagrams for showing the functions of the system of FIG. 4A.

In operation of the first differential circuit 10, terminals T3A and T3B (T3) are used for an differential input pair, and terminals T1A and T1B (T1) are used for a differential output pair. In operation of the second differential circuit 20, terminals T1A and T1B are used for a differential input pair, and terminals T2A and T2B are used for a differential output pair. Referring to FIG. 4B, when the control signal C5 and C4 is set at a high level and a low level, respectively, the circuit of FIG. 4A operates as an amplifier which receives an input signal S3 through terminal T3 and supplies an output signal S1 through terminal T1. On the other hand, when the control signals C5 and C4 are set at a low level and a high level, respectively, the circuit of FIG. 4A operates as an amplifier which receives an input signal S1 through terminal T1 and supplies an output signal S2 through terminal T2.

As shown in FIG. 4B, terminal T1 is connected to antenna ANT (and also to the ground), terminal T2 is connected to an input pair of a receiving section RX, and terminal T3 is connected to an output pair of a transmitting section TX. Accordingly, the second differential circuit 20 operates as a RF amplifier for received signal while the first differential circuit 10 operates as a power amplifier for transmission signal.

As for the control signals C4 and C5, when bias resistors R13 and R23 have resistances, for example, larger than 10 kΩ, the control signals C4 and C5 can be generated by ordinary CMOS inverters. Accordingly, a circuit section for generating the control signals C4 and C5 for activating and inactivating differential circuits 10 and 20 can be obtained with ease.

Figure 4C:
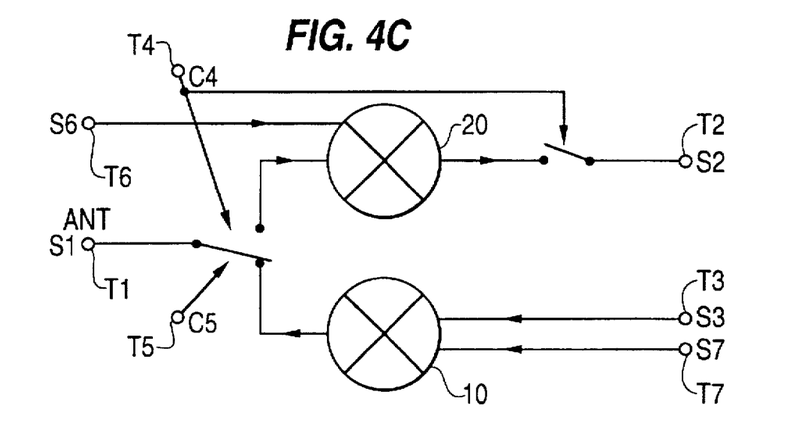

As indicated by broken lines in FIG. 4A, there may be provided signal terminals T6 and T7 connected to respective bases of transistors Q23 and Q13 which form respective current mirror circuits for supplying emitter current to the differential circuits 10 and 20. If signals S6 and S7 for mixing use are supplied through terminals T6 and T7, as shown in FIG. 4C, the differential circuits 10 and 20 operate as multipliers, i.e., mixers for frequency conversion, in which input signals S8 and S7 are used as multipliers for signals S2 and S1, respectively.

As described above, the input/output stage section of FIG. 4A can operate both for receiving and transmitting radio signals in a time shared control, through inputting a changeover signal and control signals.

Second Embodiment

Figure 5A:
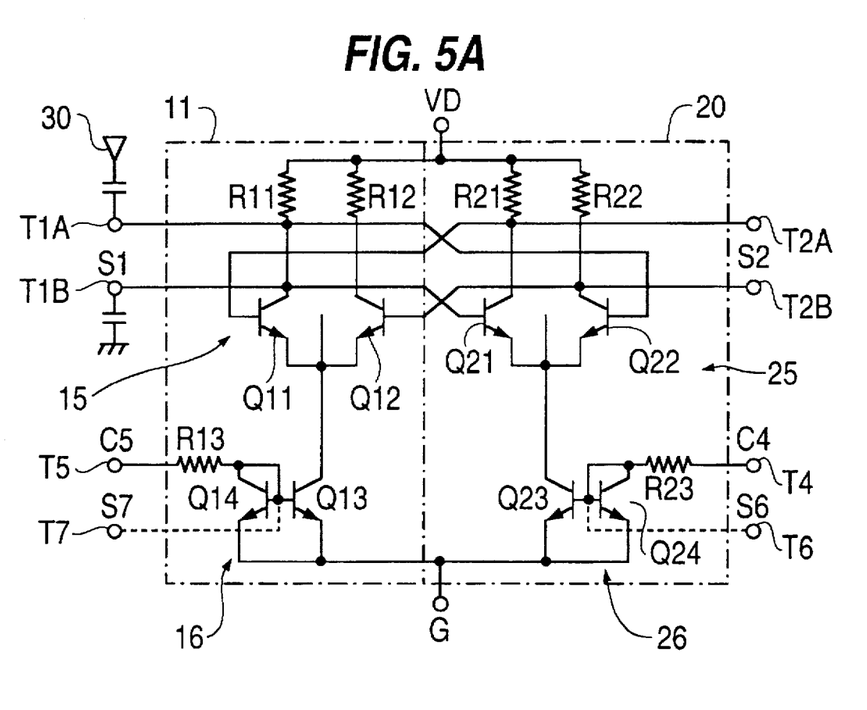
Figure 5B:
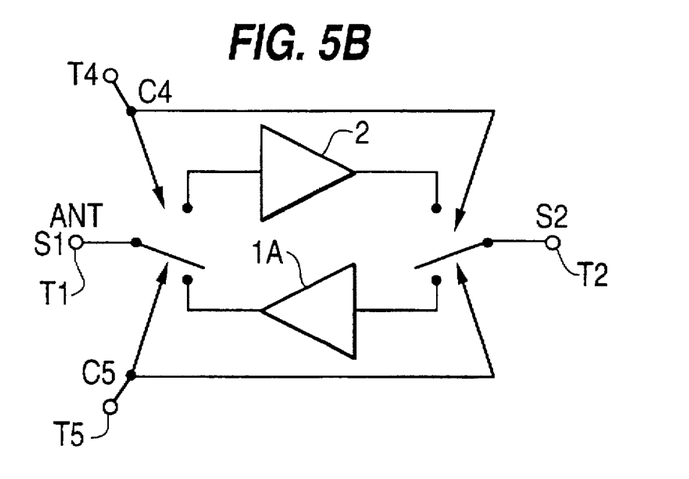
FIG. 5B is a block diagram for showing the function of system of FIG. 5A.

Referring to FIGS. 5A and 5B, there are shown an input/output stage section of a radiocommunication system according to a second embodiment of the present invention and a functional diagram thereof, similarly to FIGS. 4A and 4B. In these drawings and following drawing, similar constituent elements are designated by the same reference numerals/characters, for which detailed description will be omitted hereinafter for avoiding a duplication. The input/output stage section of FIG. 5A differs from that of the first embodiment in that, in FIG. 5A, terminals T2A and T2B are connected to the bases of transistors Q11 and Q12, respectively, thereby eliminating terminals T1A and T1B.

The function of the input/output stage circuit of FIG. 5A will be understood from FIG. 5B. When the control signals C5 and C4 are set at a high level and a low level, respectively, the input/output stage section operates as an amplifier which receives an input signal S2 through terminal T2 and supplies an output signal S1 through terminal T1. On the other hand, when the control signals C5 and C4 are set at a low level and a high level, respectively, the input/output stage section operates as an amplifier which receives an input signal S1 through terminal T1 and supplies an output signal S2 through terminal T2.

When signals S6 and S7 are supplied through terminals T6 and T7, as illustrated by broken lines similarly to the first embodiment, the input/output stage section operates as a bidirectional mixing circuit for signals S1 and S6 or for signals S2 and S7.

Third Embodiment

Figure 6:
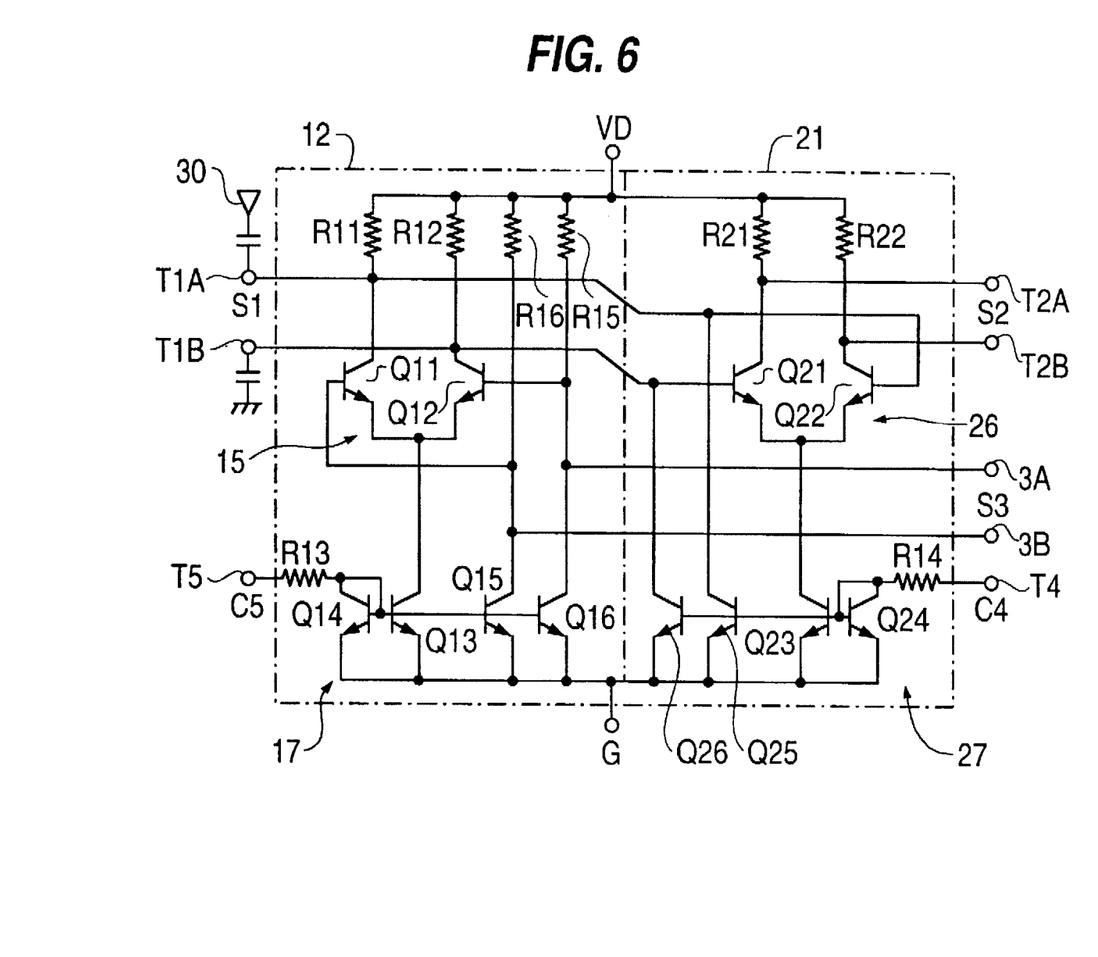
FIG. 6 is a circuit diagram of a radiocommunication system according to a third embodiment of the present invention.

Referring to FIG. 6, there is shown an input/output stage section of a radiocommunication system according to a third embodiment of the present invention. The input/output stage section in the present embodiment differs from the input/output stage section in the first embodiment in that a first and a second differential circuits 12 and 21 additionally include constant current sources for the bases of the differential transistor pairs. The first differential circuit 12 includes a pair of transistors Q15 and Q16 having bases connected in common to the bases of transistors Q13 and Q14 to form a first current mirror circuit 17, and bias resistors R15 and R16 connected in series to transistors Q15 and Q16, respectively, between power supply lines VD and G, thereby biasing the bases of transistors Q11 and Q12. Transistors Q15 and Q16 operate as constant current sources for providing constant bias potentials to the bases of the transistors Q11 and Q2, respect The second differential circuit 21 includes a pair of transistors Q25 and Q28 having bases connected in common to the bases of transistors Q23 and Q24 to form a second current mirror circuit 27. Transistors Q25 and Q26 are connected between terminal T1A and ground and between terminal T1B and ground, respectively, operating as constant current sources for providing bias potentials to the bases of transistors Q22 and Q21, respectively. Each of transistors Q15, Q16, Q25 and Q26 has an emitter size similar to those of transistors Q14 and Q24.

With the configuration in the third embodiment as described above, optimal and stable bias potentials can be provided to the bases of the pair of transistors Q11 and Q12 and the pair of transistors Q21 and Q22, respectively, so that sufficient collector-to-emitter voltages of transistors Q11, Q12, Q21 and Q22 can be obtained.

Fourth Embodiment

Figure 7:
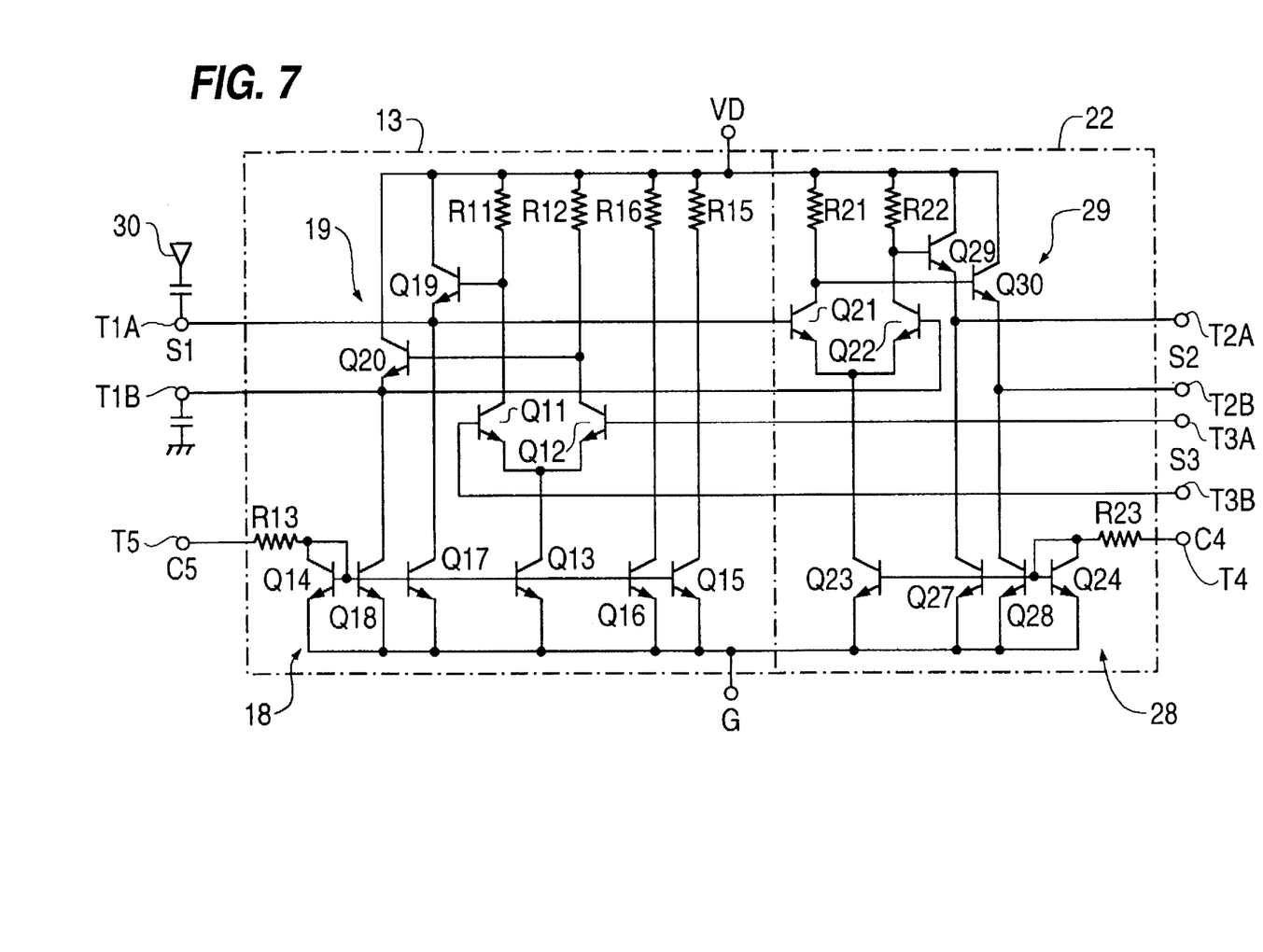
FIG. 7 is a circuit diagram of a radiocommunication system according to a fourth embodiment of the present invention.

Referring to FIG. 7, there is shown an input/output stage section of a radiocommunication system according to a fourth embodiment of the present invention. The present embodiment differs from the third embodiment in the configurations of a first and a second differential circuits 13 and 22. The first differential circuit 13 includes, additionally to the constituent elements of FIG. 6, emitter followers disposed at the respective outputs of the first differential transistor pair Q11 and Q12. The emitter follower are formed by transistors Q17 and Q18, and transistors Q19 and Q20. Transistor Q19 has a base connected to the collector of transistor Q11, a current path connected between supply lines VD and G, with transistor Q17 being a current source. Transistor Q20 has a base connected to the collector of transistor Q12 and a current path connected between supply lines VD and G, with transistor Q18 being a constant current source. Transistors Q13 through Q18 have bases connected in common to form a first current mirror circuit 18.

The second differential circuit 22 includes, additionally to the second differential circuit 21 of FIG. 6, emitter followers disposed at the respective outputs of the second differential transistor pair Q21 and Q22. The emitter followers are formed by transistors Q29 and Q27 and transistors Q30 and Q28. Transistors Q23, Q24, Q27 and Q28 have bases connected in common to form a second current mirror circuit 28. Transistor Q27 through Q30 in the second differential circuit 22 correspond to transistors Q17 through Q20 in the first differential circuit 13, respectively.

With the structure of the fourth embodiment as described above, isolation between transmitting section 13 and receiving section 22 can be improved as described below.

Figure 8:
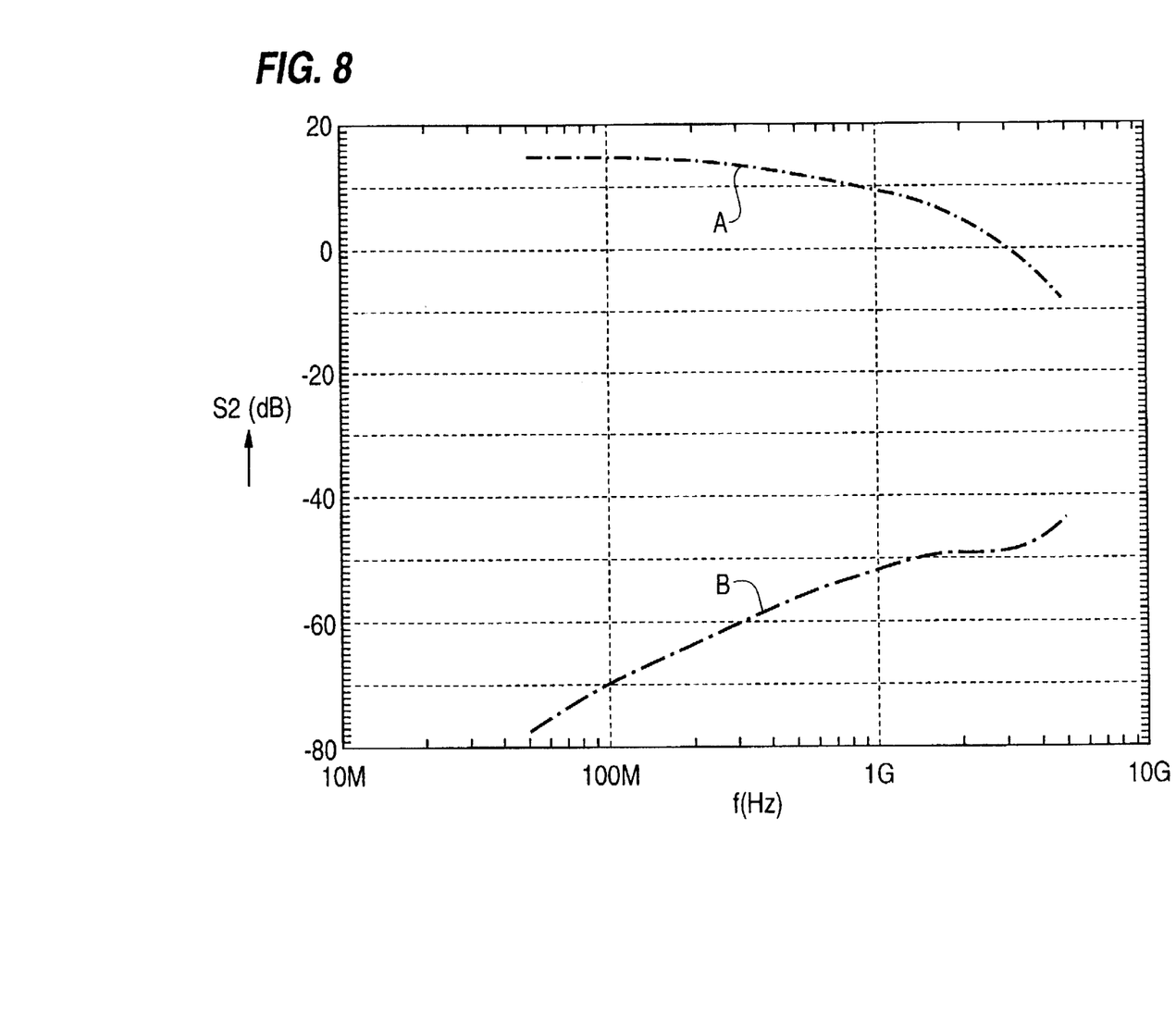
FIG. 8 is a frequency characteristic chart showing an example of operation of the radiocommunication system according to the fourth embodiment.

FIG. 8 shows the results of computer simulations on the frequency characteristic of the input/output stage circuit in the fourth embodiment. A simulation was first performed under the assumption that terminal T1B was connected to ground through a bypass capacitor to thereby ground terminal T1B in a RF range. While the control signal C4 supplied through terminal T4 was set at a high level, an input signal S1 was supplied through terminal T1A to obtain an output signal S2 through terminal T2A. Curve A shows the level of the output signal S2, which should be high in view of the amplifying function of the differential circuit 22. As will be understood from curve A, the second differential circuit 22 operates as an amplifier which provides an output signal S2 having a level as high as about 10 dB at 1 GHz.

Curve B shows the level of the output signal S2 obtained by another simulation which was performed under the assumption that the second differential circuit 2B was inactivated by switching the control signal C4 to a low level while maintaining the other conditions the same as those in the first simulation. As seen from curve B, the level of the output signal S2, which should be low compared to Curve A in view of isolation between the transmitting section and the receiving section, is maintained as low as about −50 dB at 1 GHz. Accordingly, it is demonstrated by the curves A and B of the simulations that the input/output stage section of FIG. 7 has an excellent isolation performance.

In the embodiments as described above, a power supply source for providing a negative voltage is not necessary so that the circuit structure of the system is simplified.

Further, the systems as described above can be implemented only by NPN transistors without including PNP transistors, coils or capacitors in the input/output stage section, which raises the fabrication costs of the systems.

Since above embodiments are described only for examples, the present invention is not limited to such embodiments and it will be obvious for those skilled in the art that various modifications or alterations can be easily made based on the above embodiments within the scope of the present invention.

What is claimed is:

1. A radiocommunication system comprising:

an antenna, an input/output stage section including a first differential transistor pair having an input pair and an output pair for supplying a differential output through said antenna, a first current source operatively connected to said first differential transistor pair, a second differential transistor pair having an input pair for receiving an input signal through said antenna and an output, a second current source operatively connected to said second differential transistor pair, each of said first and second current sources being activated and inactivated in a time shared control by a changeover signal for supplying operational current to a corresponding one of said first and second differential transistor pairs;

a transmitting section having an output pair connected to the input pair of said first differential transistor pair; and a receiving section having an input pair connected to the output pair of said second differential transistor pair.

2. A radiocommunication system as defined in claim 1 wherein each of said first and second current sources has a current mirror circuit including a first transistor for receiving said changeover signal and a second transistor for supplying said operational current.

3. A radiocommunication system as defined in claim 2 wherein each of said first and second current mirror circuits further includes a third and a fourth transistors each for biasing the input of a corresponding one of said first and second differential transistor pairs.

4. A radiocommunication system as defined in claim 3 further including an emitter follower for each of output pair of each of first and second differential transistor pair, wherein each of said first and second current mirror circuits further includes a fifth and a six transistors each acting as a current source for said each said emitter follower.

5. A radiocommunication system as defined in claim 2 wherein said changeover signal is a digital signal.

6. A radiocommunication system as defined in claim 2 wherein said changeover signal includes an analog component acting as a multiplier for one of the input pair of a corresponding one of said first and second differential transistor pair.

7. A radiocommunication system as defined in claim 1 wherein the input pair of said first differential transistor pair is connected to the output pair of said second differential transistor pair.

8. A radiocommunication system as defined in claim 1 further including a bias circuit for each of input pair of each of said first and second differential transistor pairs.

9. A radiocommunication system as defined in claim 1 further including an emitter follower for each of output pair of each of said first and second differential transistor pairs.

* * * * *